M. J. FRAMBACH & A. R. CORRINGTON.
ANTISLIPPING DEVICE.
APPLICATION FILED NOV. 17, 1911. RENEWED DEC. 17, 1913.
1,096,101.
Patented May 12, 1914.
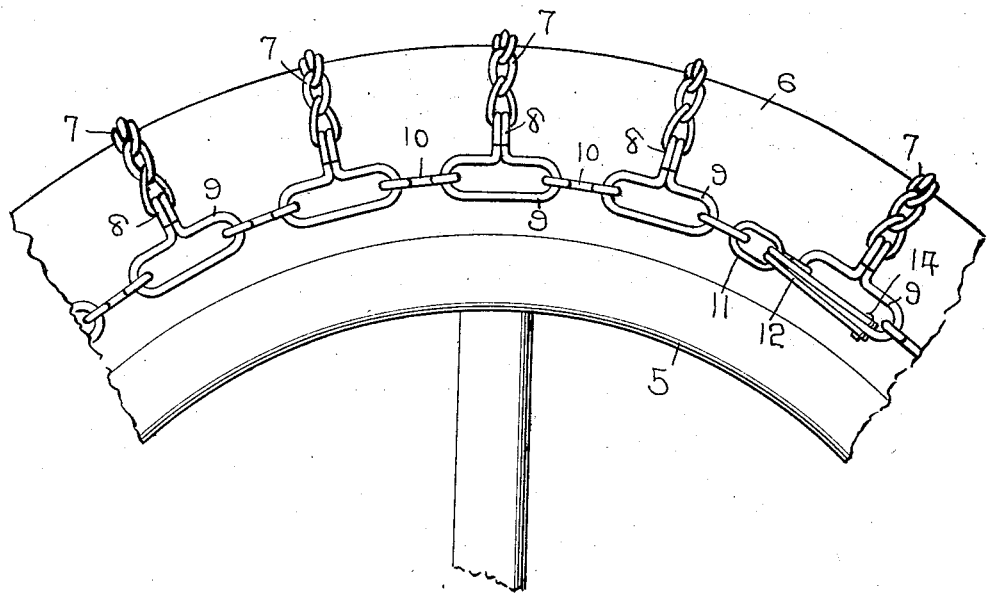
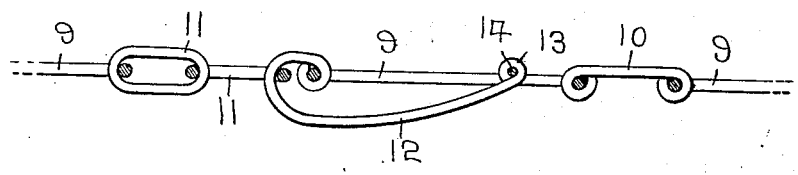
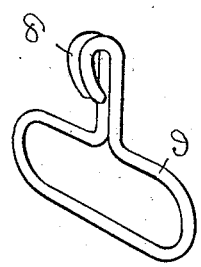
WITNESSES:
Thos. W. Riley
M. Newcomb
INVENTORS
M. J. Frambach.
A. R. Corrington.
BY W. T. Fitzgerald & Co.,
Attorneys

UNITED STATES PATENT OFFICE.

MATHEW J. FRAMBACH AND ALDON R. CORRINGTON, OF HARTLEY, IOWA, ASSIGNORS OF ONE-SIXTH TO THOMAS V. GARVIN, OF DES MOINES, IOWA.

ANTISLIPPING DEVICE.

1,096,101. Specification of Letters Patent. Patented May 12, 1914.

Application filed November 17, 1911, Serial No. 660,800. Renewed December 17, 1913. Serial No. 807,330.

*To all whom it may concern:*

Be it known that we, MATHEW J. FRAMBACH and ALDON R. CORRINGTON, citizens of the United States, residing at Hartley, in the county of O'Brien and State of Iowa, have invented certain new and useful Improvements in Antislipping Devices; and we do hereby declare the following to be a full, clear, and exact description of the invention, such as will enable others skilled in the art to which it appertains to make and use the same.

Our invention relates to new and useful improvements in anti-slipping devices and more particularly to anti-slipping devices adapted to be used in connection with pneumatic, cushion or other forms of vehicle tires.

The object of our invention is to provide an anti-slipping device, which will at all times be held in close engagement with the tire.

Other objects and advantages of our invention will be hereinafter made clearly apparent in the specification and pointed out in the claim.

In the accompanying drawings we have shown the preferred form which our invention may take.

In said drawings, Figure 1 is a side elevation showing portions of a vehicle wheel and our improved form of anti-slipping device and the manner of securing the same in place. Fig. 2 is a detail sectional view, showing the manner of securing our anti-slipping device in place, and, Fig. 3 is a perspective view, showing one of the side hooks employed in our device.

Referring to the drawings in which similar reference numerals designate corresponding parts throughout the several views, 5 is a vehicle wheel, which may be of any desired construction and provided with a tire 6. The tire 6 may be a pneumatic or cushion tire and formed of rubber or other preferred suitable material.

With the usual form of anti-slipping device employing chains, arranged transversely of the tread, the same become loose and very quickly loosen the portion of the tread thereunder, due to the rolling of the chain over the tread when the vehicle is in use. Our anti-slipping device consists of a plurality of chains 7, which are arranged transversely of the tire, the ends of the chains being detachably connected to the hooked ends 8 of connecting members 9. The connecting members 9, as clearly shown in Fig. 3, are preferably formed of one piece of steel wire, which is bent in the manner shown in Fig. 3. As clearly shown in said figure, the ends of the wire are arranged in parallel directions and the extreme ends thereof are bent back adjacent the body of the wire so as to form the hooked ends 8. The central portion of the wire is bent so as to form the substantially O-shaped link portion 9, the plane of which is at right angles to the hooks 8. Adjoining ends of adjacent links 9 are connected by means of links 10.

In Fig. 2 we have shown the preferred form of link 10, which consists of a section of steel wire having its ends looped to engage the links 9. A sufficient number of the links 9 and 10 are connected together to extend substantially around the periphery of the tire, with which the same is to be used. In order to secure the same upon the tire, we preferably secure a chain 11 to the link 9 at one end of the series and a spring locking member 12 to the other end of said series. The spring locking member 12 is preferably formed from a single length of wire, which is first doubled and the looped end secured around the end of the link 9, as clearly shown in Fig. 2. The wire is then bent into the form shown in Fig. 2 and the ends of each wire turned back upon itself to form a looped end 13.

When it is desired to secure the anti-slipping device in place the looped ends 13 are passed through one of the links of the chain 11 and the spring member 12 turned so as to occupy the position shown in Fig. 2, with the looped ends 13 of the member 12 extending upon opposite sides of one portion of the link 9, to which it is secured, as clearly shown in Fig. 1. A pin 14 is then passed through the looped ends to hold the same securely in place.

In practice the locking member 12 is extended through the link of the chain 11 which, when the locking member is secured in position, will give the necessary tension to our anti-slipping device. By forming the links 9 in the manner shown in the drawing, the same may be placed under considerable tension so that the anti-slipping device will be maintained tight upon the tread of the wheel at all times.

The point of greatest wear in anti-slipping devices of this character is at the connecting point between the transverse chains 7 and the connecting devices for the ends thereof. In our construction it will be seen that the connecting links 9 are formed with double hooked ends 8 so as to strengthen said links where most needed.

From the foregoing description it will be seen that we have provided an anti-slipping device which will at all times be maintained tightly upon the tread of the wheel with which the same may be used. It will also be seen that our device is of very cheap construction and that any part thereof which may become worn may be very readily replaced. It will also be seen that by forming the links 9 in the manner shown, that the side walls of the tire will be sufficiently armored to protect the same from wear when the vehicle wheel happens to go into ruts or is run over a very rough roadway.

What we claim as new is:

A non-skidding wheel attachment consisting of a pair of companion side chains adapted to be placed against the sides of a vehicle wheel tire, said side chains comprising major links having relatively large closed loops and terminal normally contacting open spring hooks extending laterally thereof, the loops normally lying in bodily contact with the side of the tire, relatively short minor links connecting the contiguous ends of the major links in proper relation to each other, and tread chains having loose detachable end connection with the terminal hooks and holding said major links yieldingly closed.

In testimony whereof we have signed our names to this specification in the presence of two subscribing witnesses.

MATHEW J. FRAMBACH.
ALDON R. CORRINGTON.

Witnesses:
W. F. SCHILDT,
H. P. MOUSEL.

Copies of this patent may be obtained for five cents each, by addressing the "Commissioner of Patents, Washington, D. C."